Jan. 30, 1951 M. TOWEY 2,539,496
FISH HOLDER
Filed April 7, 1949
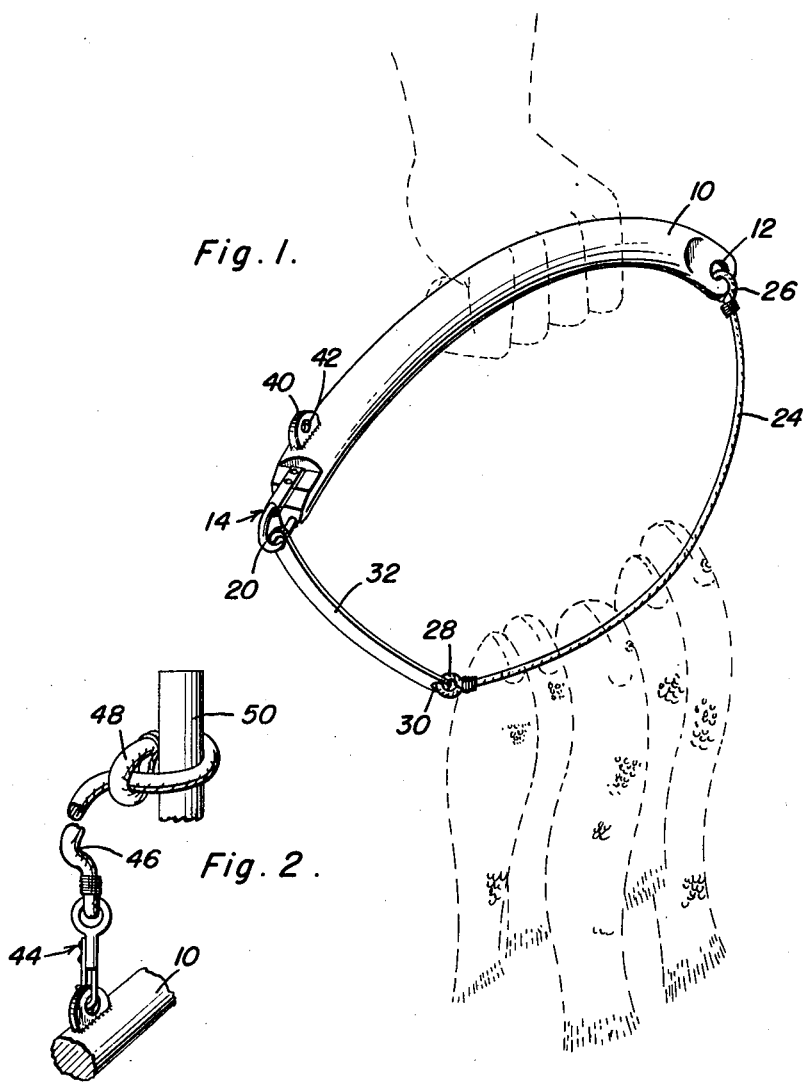
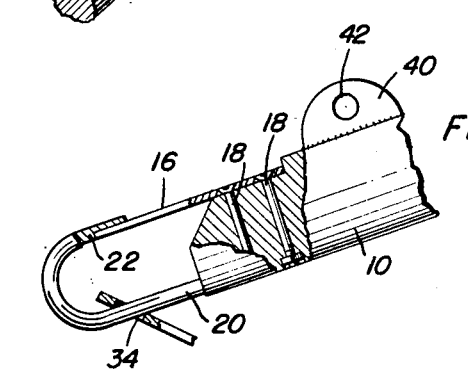
Inventor
Michael Towey
By Clarence A. O'Brien and Harvey B. Jacobson
Attorneys Patented Jan. 30, 1951

2,539,496

UNITED STATES PATENT OFFICE 2,539,496

FISH HOLDER

Michael Towey, Durban, Natal,
Union of South Africa

Application April 7, 1949, Serial No. 85,981

1 Claim. (Cl. 224—7)

This invention relates to novel and useful improvements in devices for retaining fish in an orderly and convenient fashion after they have been caught.

An object of this invention is to retain fish on a thoroughly rust-resistant device by passing the end of a strap through an appropriate part of the fish and stowing the fish successively on a bendable or flexible member, the strap being releasably maintained by a clamp which is carried at one end of a smoothly curved handle and the flexible fish retaining member being carried by the opposite end of said handle.

Another object of this invention is to releasably support the handle and other structure on a convenient element such as part of a boat by means of an attachment which is removably carried by a part of the handle.

Another object of this invention is to supply an extremely simplified device of the character to be described which is of rust-resistant material whereby it is unnecessary to constantly clean the apparatus after use and before using the same apparatus the next time, the cleaning being necessary to rid the device of rust.

Ancillary objects and features of novelty will become apparent to those skilled in the art, and following the description of the preferred form of the invention, illustrated in the accompanying drawings, wherein:

Figure 1 is a perspective view of the preferred form of the invention, showing the same in use;

Figure 2 is a fragmentary perspective view of an attachment which is optional equipment with the fish holder and which is used for attachment of the fish holder to a convenient element such as a part of the boat;

Figure 3 is a fragmentary elevational view, parts being broken away in section to show the detail of construction, and illustrative of the clamp at one end of the handle for retaining an end of the strap which pierces the fish for fixing them to the flexible member.

The present invention relates to a device which is used for the purpose of holding fish conveniently and effectively. It is of a portable nature whereby the fish may be carried conveniently from the fishing site, whether it be from a boat or bridge, river bank or the like.

In devices of this general nature there has been a serious objection to the use thereof for the reason that rust and corrosion renders the devices unsightly and even unsafe for use. Hence, it is one of the intents of this invention to teach the use of such a device which is substantially rust-proof and which is at least, made from rust-resistant materials.

A smoothly curved elongated handle 10 which is composed of some suitable rust-resistant material such as stainless steel tubing, aluminum tubing or wood, is provided with an opening or aperture 12 at one end thereof. At the opposite end there is a clamp generally indicated at 14. The clamp consists of a resilient finger 16 (Figure 3) attached to the handle 10 by any suitable means such as the bolts 18, rivets or the like. A substantially U-shaped member 20 is attached at one end to the handle 10 and has a reduced portion 22 at the other end forming a seat for the resilient finger 16.

A bendable or flexible member 24 is supplied with eyes 26 and 28 respectively at opposite ends thereof. This bendable member is used for the purpose of retaining fish thereon as is indicated in Figure 1. The eye 26 is disposed in the aperture 12, while the eye 28 is disposed in an aperture 30, the last-named aperture 30 being formed in a substantially rust-proof strap 32.

The opposite end of the strap has another aperture 34 therein which is removably and releasably disposed on the U-shaped member 20.

In operation after fish are caught the end of the strap 32 is inserted through an appropriate part of the fish and the said fish is slid down the strap 32 until they are lined in side by side relation on the flexible or bendable element or member 24. The U-shaped member 20 is pushed through the aperture 34 thereby fixing the end of the strap 32 to the handle.

In order that the device may be attached very easily to an appropriate anchorage such as a part of a boat, an ear or bracket 40 is secured to the handle 10 by any suitable means as welding, brazing or may be formed integral therewith as desired. This bracket 40 has an opening 42 therein which releasably and removably accommodates a spring clip 44. This spring clip is disposed at one end of a cord or rope 46 which is formed with an eye 48 at the opposite end. The eye is used for the purpose of having the said cord or rope 46 pass therethrough thereby forming a loop in order that it may be disposed on the post 50 or any other suitable member.

The device is also adapted for hand operation as shown in Figure 1 whereby the fish may be carried from the fishing site to any destination as desired.

From the foregoing a clear understanding of the structure and operation of the invention is deemed apparent. However, it is noted that certain variations may be made without departing from the spirit of the invention.

Having described the invention, what is claimed as new is:

In a fish holder composed of rust resistant materials, an elongated curved handle having an opening at one end and a notch with a clamp therein at the other end, a flexible member attached at one end in said opening, a curved strap for piercing a portion of a fish attached at one end to the opposite end of said flexible member, said flexible member being adapted to retain fish thereon, the opposite end of said strap being provided with an opening and said clamp being passed therethrough, a bracket fixed to said handle, and means removably carried by said bracket for fixing said handle.

MICHAEL TOWEY.

REFERENCES CITED

The following references are of record in the file of this patent:

UNITED STATES PATENTS

| Number | Name | Date |
| --- | --- | --- |
| 2,004,247 | McCaul | June 11, 1935 |
| 2,226,402 | Hirschmann | Dec. 24, 1940 |
| 2,437,331 | Murray et al. | Mar. 9, 1948 |
| 2,455,766 | Harvey | Dec. 7, 1948 |

FOREIGN PATENTS

| Number | Country | Date |
| --- | --- | --- |
| 18,185 | Great Britain | Oct. 12, 1900 |